United States Patent [19]

Irissou et al.

[11] 3,849,715

[45] Nov. 19, 1974

[54] ADJUSTABLE STEPPING DRIVE FOR MOTION-PICTURE FILM

[76] Inventors: Pierre Regis Marie Henri Irissou, 2 rue Albert de Mun, Meudon-Bellevue; Pierre Jean Francois Jacques Sarda, 26 rue du Parc de Clagny, Versailles, both of France

[22] Filed: Mar. 21, 1973

[21] Appl. No.: 343,403

[30] Foreign Application Priority Data
Mar. 23, 1972  France ............................ 72.10192

[52] U.S. Cl. .................. 318/696, 318/341, 318/685
[51] Int. Cl. ........................................ G05b 19/40
[58] Field of Search .......... 318/696, 685, 341, 313, 318/138; 310/49

[56] References Cited
UNITED STATES PATENTS

| | | | |
|---|---|---|---|
| 3,385,984 | 5/1968 | O'Regan | 318/696 |
| 3,593,097 | 7/1971 | Gebelein | 318/696 |
| 3,626,269 | 12/1971 | Stanley | 318/696 |
| 3,628,119 | 12/1971 | Abraham | 318/685 |
| 3,660,746 | 5/1972 | Milek | 318/696 |
| 3,752,959 | 8/1973 | May | 318/696 |

Primary Examiner—G. R. Simmons
Attorney, Agent, or Firm—Karl F. Ross; Herbert Dubno

[57] ABSTRACT

A stepping motor for intermittently advancing a motion-picture film, in a projector or a camera, has a stator with an annular array of magnet poles divided into $2n$ sectors of $p$ poles each, $p$ being at least equal to 3, co-operating with a stator having a concentric array of teeth whose $2n$ sectors contain (q) teeth with $q$ an integer greater than $p/2$ but less than $p$. Each pole of one sector is paired with a correspondingly positioned pole of an adjoining sector, the two poles of a pair being antiphasally excitable by a short pulse whereby sequential energization of the several pole pairs attracts the rotor into successive rotary positions by angular increments equaling a fraction $\alpha/p$ of a tooth spacing $\alpha=\pi/nq$. After a series of $p$ pulses, the rotor has advanced by one or more tooth spacings $\alpha$ into a position in which one pole in each sector remains energized for a prolonged period to arrest the entrained film and to light a projection lamp and/or open an associated shutter. The stepping rate can be altered by varying the pulse cadence; the sense of rotation can be reversed by switching the sequence of pole energization within each sector.

19 Claims, 7 Drawing Figures

ADJUSTABLE STEPPING DRIVE FOR MOTION-PICTURE FILM

FIELD OF THE INVENTION

Our present invention relates to an adjustable stepping drive for intermittently advancing an elongate recording medium, such as a motion-picture film, which is longitudinally subdivided into a succession of elemental areas of identical length designed to store message units whose recordal and reproduction must proceed in precisely timed intervals. Such recording media may be advanced, in discrete but rapidly recurring steps, by simple friction with the aid of feed rollers; for exact relative positioning, as in the case of a motion-picture film, the recording medium is usually provided with at least one row of longitudinally equispaced perforations for engagement by a sprocket wheel.

BACKGROUND OF THE INVENTION

It is known, e.g. from French U.S. Pat. No. 1,426,870, to drive the film-advancing sprocket of a camera or a projector by a synchronous motor energized from an oscillator of variable frequency whose adjustment enables the changing of the film speed. The motor also controls the periodic opening and closure of a shutter, in line with the objective, which must operate in precise synchronism with the film travel. Generally the film carries a whole number of perforations (a single perforation in the case of 8mm home movies) per frame so that the opening of the shutter occurs only at predetermined angular positions of the sprocket.

In such conventional systems it is customary to interpose an intermittently effective coupling, such as a Geneva movement, between the drive motor and the film sprocket for the purpose of momentarily arresting the film in each of these predetermined positions. In order to eliminate the need for such a coupling, it has already been proposed to replace the synchronous motor by a stepping motor responsive to a train of pulses whose cadence may be varied in accordance with the desired film speed. Such stepping motors, however, do not always operate satisfactorily since, on account of unavoidable manufacturing tolerances, they do not invariably stop in the exact sprocket positions required for correct superposition of the successive image frames on a screen upon projection thereof.

OBJECTS OF THE INVENTION

The general object of our present invention is to provide a stepping drive for the film of a movie camera or projector, or for similar devices utilizing an elongate and preferably perforated recording medium, in which the influence of manufacturing tolerances upon the accuracy of the taking and the projection of images is largely eliminated.

A more particular object of this invention is to provide means in such a system for permitting rapid speed changes and/or reversals to be carried out at any time, even from one frame to the next, whereby a given scene can be held seemingly stationary on the projection screen by periodically moving the film back and forth for only a few frames at a time. (A similar technique can be used to project a scene in slow motion, without flicker, by letting the film advance in a progressive reciprocating motion such as, for example, three frames forward and two frames back.)

SUMMARY OF THE INVENTION

The foregoing objects are realized, pursuant to our invention, by driving a transport means such as one or more sprockets with the aid of an electric motor whose multipole stator is provided with electromagnetic means forming at least one principal pair of magnet poles which in an energized state generate a magnetic flux across the associated rotor, the ferromagnetic body of this rotor having a reluctance to that flux which is different in different angular rotor positions as is well known per se; the rotor is linked with a transport means by a mechanical coupling which advances the engaged recording medium by a predetermined distance (e.g. as defined by a whole number of perforations) upon rotation of the rotor from one minimum-reluctance position to another, with reference to the aforementioned principal pole pair, upon energization of the electromagnetic means of the stator for periodic excitation of its magnet poles. Thus, it is always the same pole pair which determines the operative position of the film with reference to associated equipment such as an objective, a shutter (in the case of a camera) and/or an illuminating lamp (in the case of a projector).

More particularly, according to a further feature of our invention, the stator has an annular array of angularly equispaced magnet poles, connected for sequential energization, divided into $2n$ sectors of $p$ poles each, $n$ and $p$ being integers; the rotor body is provided with a set of angularly equispaced projections or teeth forming armatures for the magnet poles, this set being divided into $2n$ sectors of $q$ projections each, with $q$ an integer greater than $p/2$ but less than $p$ (for which reason it is necessary that $p$ be at least equal to 3).

Correspondingly positioned magnet poles of two adjoining sectors form a pole pair and are interconnected for concurrent antiphasal excitation. Each sector contains a principal pole and $(p-1)$ ancillary poles.

For the consecutive energization of these pole pairs, another feature of our invention resides in the provision of a pulse generator emitting consecutive sequence of $mp$ pulses each, $m$ being an integer. An operative or stopping position for the rotor is defined by a pair of principal poles energized at the end of each pulse sequence, its energization lasting for an extended interval during which the rotor and the film-transporting means (e.g. sprockets) are temporarily arrested as certain rotor armatures are aligned with the principal stator poles. With $m=1$ such energization occurs $2n$ times per revolution of the rotor, i.e. whenever the same has turned through one sector; in that case the principal magnet poles are confronted by different pairs of teeth upon successive energization so that the teeth of the rotor must be precisely equispaced, a requirement not too difficult to satisfy with conventional manufacturing techniques. With $m=2nq$, on the other hand, the rotor performs a full revolution between film stoppages so that less accuracy in its teeth spacing is required. In any event, the rotor passes without stopping through two or more transistory positions in which certain of its armatures are aligned with ancillary stator poles.

In a preferred embodiment, $q=p-1$ so that the numbers of teeth and of magnet poles per sector can be given their minimum value of $p=3$ and $q=2$, respectively.

In such a system it is easy to change speed by varying the cadence of the pulses energizing the pole pairs of the stator. Since the rotor comes to a complete halt at the end of each pulse sequence, i.e. upon the taking or projection of each frame, such a speed change can be effected from one pulse sequence to the next. Also, the order of excitation of the pole pairs can be readily switched to reverse the sense of rotation at any frame.

Advantageously, in accordance with still another feature of our invention, the sequential energization of the pole pairs from the pulse generator is carried out with the aid of a logic network, which may include a binary frequency divider, having $p$ outputs energized in immediate succession by consecutive pulses from the generator whereby the rotor is advanced practically without pause during each pulse sequence by the counterrotating magnetic field so produced. This logic network may include a set of coincidence (AND, NAND or NOR) gates which can be selectively biased to invert the order of energization of these $p$ outputs.

The pulse generator, in conformity with yet a further feature of our invention, may comprise a timing circuit provided with a feedback connection from one of the output leads of the stator winding for terminating a pulse sequence in response to the excitation of a pole pair immediately preceding the principal pole pair in the order of energization; the rotor then comes to a halt in its cricital position of operative alignment (i.e. of minimum reluctance) with reference to the principal pole pair. Advantageously, the timing circuit simultaneously reduces the supply voltage to the stator in that critical position to prevent overheating of the active winding during the standstill interval. With $m > 1$, the feedback connection should include an $m$-stage pulse counter.

The timing circuit may comprise a flip-flop which is settable by an astable multivibrator to start a pulse sequence and which is resettable by the aforedescribed feedback connection; the flip-flop, when reset, blocks an oscillatory circuit of adjustable frequency generating the pulse train. An adjustable impedance allows the switchover period of the multivibrator to be varied for altering, if desired, the interval between pulse sequences during which the rotor and the film transport are arrested. Jointly therewith, or independently thereof, the operating frequency of the oscillatory circuit can be adjusted to change the rotor speed.

The pulse generator according to our invention can also be used to control directly, without the intermediary of the stepping motor, the associated equipment to be actuated during each standstill interval of the film transport, specifically the aforementioned shutter; in a projector equipped with a flashing light source, however, the shutter may be omitted if the flash is triggered by the pulse generator at the proper instants. Such actuation of a shutter and/or a flashing lamp can be performed by an output connection of the astable multivibrator, in the reset state of the flip-flop.

BRIEF DESCRIPTION OF THE DRAWING

The above and other features of our invention will now be described in detail with reference to the accompanying drawing in which.

SPECIFIC DESCRIPTION

Figure 1:
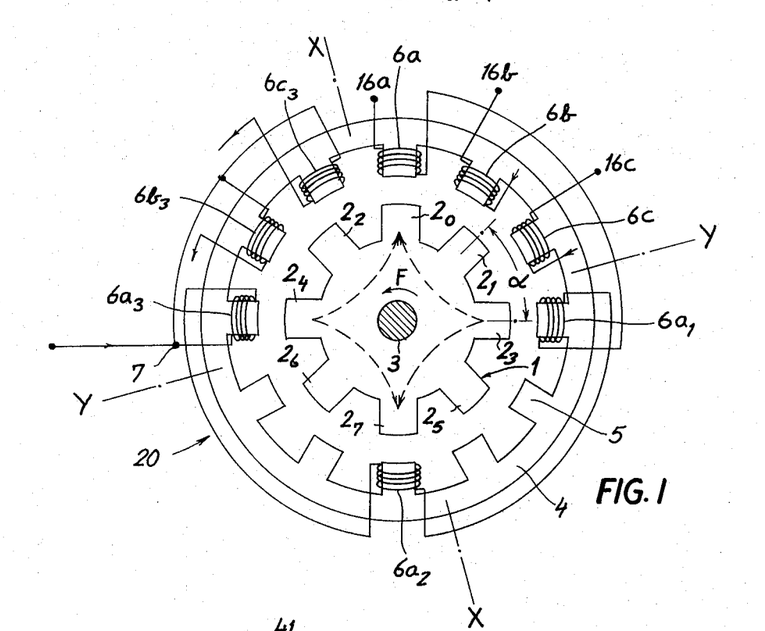
FIG. 1 is a somewhat diagrammatic view of an electric motor forming part of a system embodying our invention.

In FIG. 1 we have shown an electric motor with a rotor 1 keyed to a shaft 3 and a stator 4 centered on that shaft. Rotor 1 has a ferromagnetic body with eight peripherally equispaced teeth $2_0 - 2_7$ confronting a similar array of inwardly projecting magnet poles 5 integral with the ferromagnetic stator body. The stator poles are divided by two orthogonally intersecting lines X — X and Y — Y into four quadrantal sectors ($n = 2$) of three poles each ($p = 3$), the rotor 1 also being divided into four quadrants of two teeth each ($q = 2$). The poles 5 are provided with individual excitation windings (some of which have been omitted for clarity) designated 6a, 6b, 6c (in clockwise order) for the first upper right-hand sector, $6a_1$ etc. for the lower right-hand sector, $6a_2$ etc. for the lower left-hand sector, and $6a_3 - 6c_3$ for the upper left-hand sector. All these windings are energizable from a common bus bar 7, in a manner more fully described below with reference to FIGS. 2 – 4, by way of three circuits with individual terminals 16a, 16b and 16c, respectively. The circuit ending at terminal 16a serves the windings 6a, $6a_1$, $6a_2$ and $6a_3$ of the four principal poles occupying the No. 1 position of their respective circuits; coils 6a and $6a_2$ are wound in one sense whereas coils $6a_1$ and $6a_3$ are wound in the opposite sense whereby their associated poles are antiphasally excited upon closure of their energizing circuit. In an analogous manner, the windings $16b - 16b_3$ of the ancillary poles formed by the No. 2 magnets are interconnected with relative inversion in adjacent sectors for concurrent and antiphasal excitation upon the application of the proper energizing voltage (e.g. ground) to terminal 16b; the same rule applies to the windings $16c - 16c_3$ of the ancillary poles formed by the No. 3 magnets whose energizing circuit includes the terminal 16c.

Thus, the grounding of terminal 16a establishes complementary (South and North) poles at windings 6a, $6a_2$ and $6a_1$, $6a_3$, respectively, whereby in the illustrated rotor position a pair of minimum-reluctance paths for the flux of these electromagnets extend from diametrically opposite teeth $2_3$ and $2_4$ to teeth $2_0$ and $2_7$ as indicated by broken-line arrows. If, therefore, the circuit of coils $6a - 6a_3$ is broken at terminal 16a and terminal 16b is grounded instead, the excitation of coils $6b - 6b_3$ moves the rotor 1 through an angle of 15° until its teeth $2_1$, $2_2$, $2_3$ and $2_6$ are aligned with the ancillary poles of the now active electromagnets. Subsequent energization of coils $6c - 6c_3$ drives the rotor 1 through a further angle of 15° until teeth $2_0$, $2_3$, $2_4$ and $2_7$ confront the ancillary poles associated with these coils. Thus, the rotor 1 turns counterclockwise (arrow F) whereas the stator field progresses in a clockwise sence. Finally, the renewed grounding of terminal 16a aligns the teeth $2_1$, $2_2$ and $2_6$ with the excited No. 1 or principal magnet poles to establish a critical rotor position geometrically identical with its starting position but spaced therefrom by $\alpha = 45°$, or $\pi/nq$.

As a result, the flux from the principal (No. 1) pole pair with windings 6a and $6a_1$ (as well as from the opposite principal pole pair with windings $6a_2$ and $6a_3$) again traverses the rotor body in a position thereof offering minimum reluctance to this flux; during the intermediate steps described above, on the other hand, these magnet poles register only incompletely or not at all with the rotor teeth so that the reluctance of the rotor body to the flux path of the No. 1 pole pairs is substantially increased.

If the sequence of grounding of terminals 16a, 6b, 16c is reversed so that windings $6c - 6c_3$ are energized immediately after windings $6a - 6a_3$, then the rotor 1 is driven in a clockwise sense as the stator field progresses counterclockwise.

In accordance with an important feature of our invention, terminals 16a, 16b, 16c, 16a (or 16a, 16c, 16d, 16a) are grounded in immediate succession so that the rotating stator field is not interrupted and the rotor 1 is driven substantially without stoppage through two transitory positions from one stopping position to the next. However, as the excitation period of each pole pair should slightly exceed the time required for the rotor to pass at full speed through its incremental angle of 15°, it may slow down perceptibly in the intermediate or transitory positions.

Figure 5:
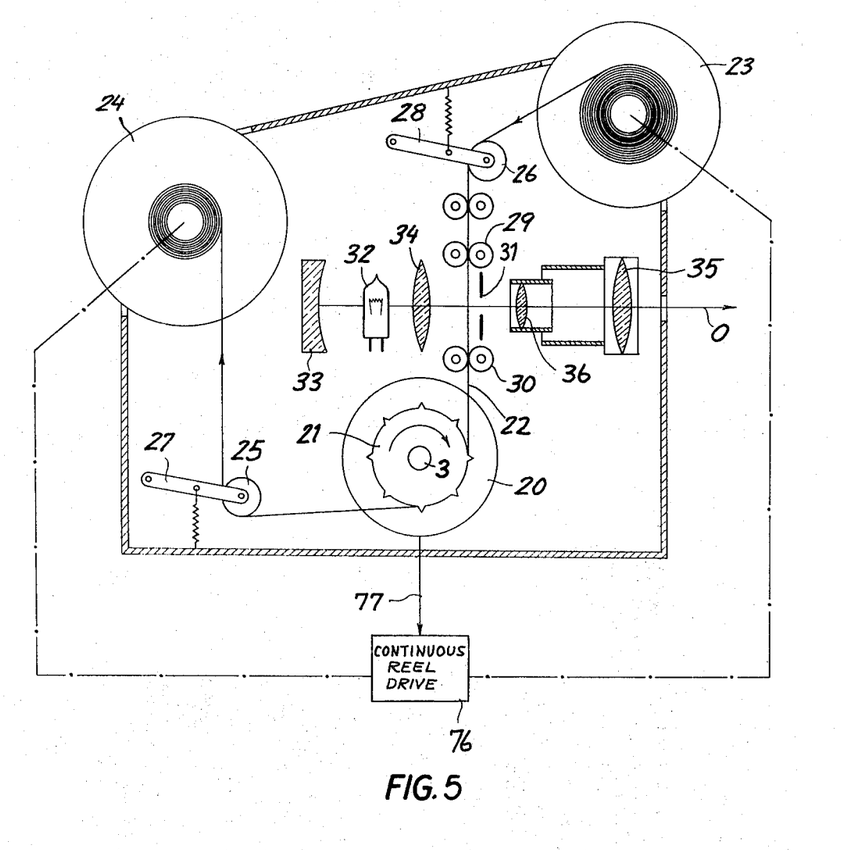
FIG. 5 is a schematic elevational view of a projector provided with a stepping drive according to our invention.

As shown in FIG. 5, the shaft 3 of motor 20 carries a sprocket wheel 21 with eight peripherally equispaced teeth passing through perforations in a film strip 22 which is being unwound from a supply reel 23 and wound upon a take-up reel 24. In the illustrated rotor position of FIG. 1, the film 22 is operatively aligned with a projection window 31 illuminated by a lamp 32 via an objective including a reflector 33, fixed lenses 34, 35 and a focusing lens 36 whose optical axis is shown at 0. As both the rotor 1 and the sprocket 21 are stepped through $\alpha = 45°$ between consecutive critical positions, the film 22 is advanced by exactly one frame. The alignment of the motor teeth with the ancillary No. 2 and No. 3 magnet poles in the intermediate or transitory stepping positions is not critical since the lamp 32 is extinguished and/or an associated shutter (FIG. 7) is closed at that time. Only in the rotor position of FIG. 1 and its geometrical equivalents, spaced 45° apart, is precise alignment between the rotor and the stator essential; this alignment is maintained for the necessary projection interval by a continuing energization of windings $6a - 6a_3$ at the end of each pulse sequence which successively grounds the terminals $16a - 16c$.

The film 22, passing between pairs of guide rollers 29 and 30, is held under tension by deflecting rollers 25 and 26 on spring-loaded lever arms 27 and 28. In addition, the reels 23 and 24 are entrained by associated torque motors forming part of a continuous reel drive schematically indicated at 76; these torque motors are under the control of stepping motor 20, as indicated at 77, so as to operate only when the stepping motor is turned on. The torque motors may be of the squirrel-cage type and are advantageously controlled by a programmer within drive 76, responsive to the stepping of motor 20, which varies the speeds of their rotating stator fields, letting it increase for the reel 23 and decrease for the reel 24 as the film is transferred from one reel to the other.

With reels 23 and 24 continuously driven whereas sprocket 21 advances intermittently, rollers 25 and 26 compensate for the resulting speed differential. For talking pictures, a pick-up head (not shown) confronting a sound track on the film 22 may be disposed in a region in which the film movement is continuous.

Figure 6:
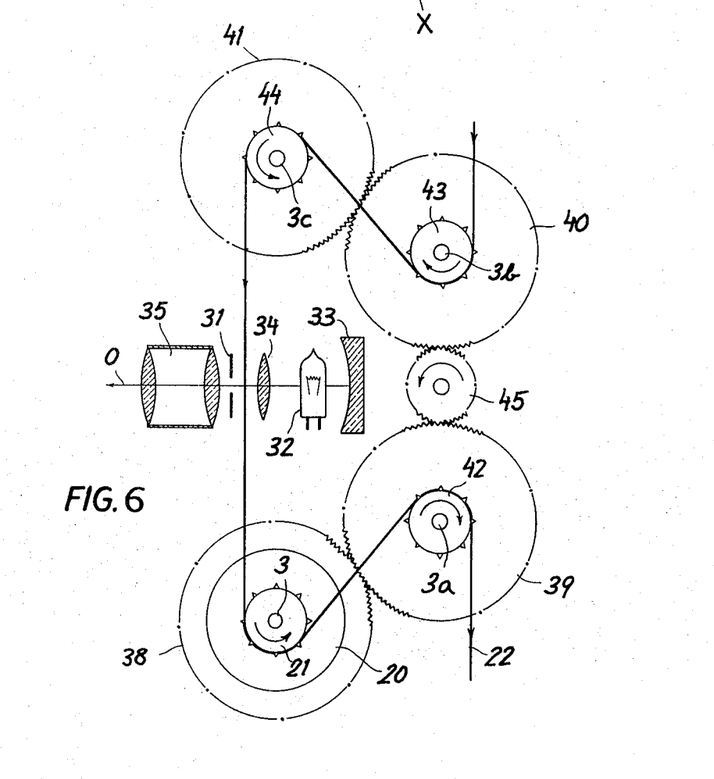
FIG. 6 is a view generally similar to that of FIG. 5, showing a partial modification of the projector.

In FIG. 6 we have shown the single sprocket 21 of FIG. 5 supplemented by three further sprockets 42, 43 and 44 whose shafts 3, 3a, 3b, 3c define the corners of an isosceles trapezoid and which are mechanically interconnected by meshing gears 38, 39, 40, 41 and a reversing pinion 45. These four sprockets are stepped in precise synchronism and engage respective portions of film 22 to move it past the objective axis 0 in the aforedescribed manner. This multiple-sprocket drive is particularly advantageous for wide films.

It should be understood that the sprockets of FIGS. 5 and 6 could be provided with additional teeth between those illustrated, in case each row of longitudinally spaced perforations of the film includes more than one perforation per frame; the film will still advance at a rate of one frame for each 45° turn of rotor 1. However, sprocket 21 need not be directly mounted on rotor shaft 3 but could be connected therewith through a step-down transmission of ratio 1 : $m$ so as to advance the film by one frame whenever the rotor 1 turns through $m \cdot 45°$, the rotor then coming to a halt upon every second, third or fourth grounding of terminal 16a. The way of establishing these various stepping modes will now be described with reference to FIGS. 2 – 4 and 7.

Figure 2:
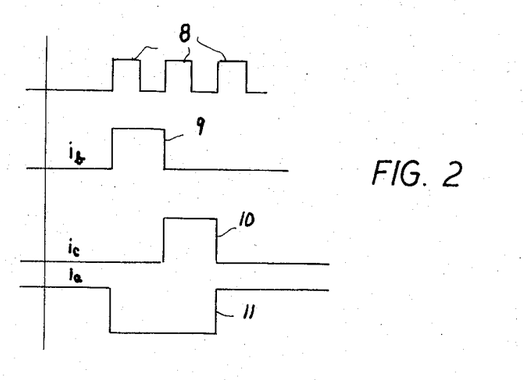
FIG. 2 is a pulse diagram serving to explain the operation of the motor of FIG. 1.

In FIG. 2 we have shown a sequence of three pulses 8 controlling the consecutive energization of the stator windings of FIG. 1 in case the rotor 1 is to be stepped only through 45° at a time ($m = 1$) as described above. The energizing currents through windings $6a - 6a_3$, $6b - 6b_3$ and $6c - 6c_3$ have been indicated at $i_a$, $i_b$ and $i_c$, respectively. Current $i_a$ flows for an extended period, to arrest the rotor 1 in its illustrated critical position, until the arrival of the first stepping pulse 8 of the three-pulse sequence whose leading edge interrupts this current while giving rise to a pulse 9 representing the flow of current $i_b$ through windings $6b - 6b_3$. Pulse 9 is twice as wide as each pulse 8 and is terminated by the leading edge of the second pulse in the sequence which generates at the same time a pulse 10 representing the flow of current $i_c$ through windings $6c - 6c_3$. The arrival of the third pulse 8 terminates the pulse 10, whose width is the same as that of pulse 9, and restores at 11 the flow of current $i_a$ through windings $6a - 6a_3$.

Figure 4:
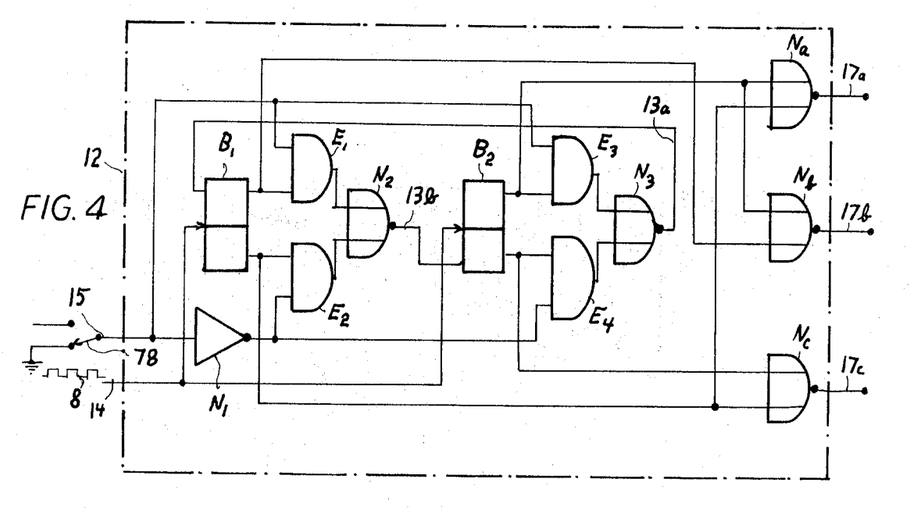
FIG. 4 is a diagram of a logic network forming part of the control circuit of FIG. 3.

The conversion of voltage pulses 8 into current pulses 9 – 11 is accomplished with the aid of a logic network 12, FIG. 4, having two input leads 14, 15 and three output leads 17a, 17b, 17c. Stepping pulses 8 appear on lead 14 whereas lead 15 is selectively connectable, by a manual switch 78, to ground or to positive potential of binary value "1". Network 12 includes a two-stage binary frequency divider comprising a pair of cascaded flip-flops $B_1$ and $B_2$ of the JK type with switching inputs connected to lead 14. Four AND gates $E_1 - E_4$ receive the outputs of these flip-flops. AND gates $E_2$ and $E_4$ are connected to that lead through an inverter $N_1$. The other inputs of gates $E_1$ and $E_2$ are connected to the reset output and the set output, respectively, of flip-flop $B_1$ whereas the remaining input of gates $E_3$ and $E_4$ are connected to corresponding outputs of flip-flop $B_2$. AND gates $E_1$ and $E_2$ work into a NOR gate $N_2$ whose output 13b terminates at a setting input of flip-flop $B_2$. Similarly, AND gates $E_3$ and $E_4$ into a NOR gate $N_3$ whose output 13a terminates at a resetting input of flip-flop $B_1$. Three other NOR gates $N_a$, $N_b$, $N_c$ feed the outputs 17a, 17b and 17c, respectively. NOR gates $N_a$ has input connections to the set output of flip-flop $B_1$ and to the reset output of flip-flop $B_2$ so as to conduct when flip-flop $B_1$ is reset and flip-flop $B_2$ is set. NOR gate $N_b$ has input connections to the reset outputs of the two flip-flops and therefore conducts when both flip-flops are set. NOR gate $N_c$ has input connections to the set outputs of the two flip-flops, conducting when both are reset.

In its quiescent state, network 12 energizes its output 17a with flip-flop $B_1$ reset and flip-flop $B_2$ set. With switch 78 in its illustrated position, AND gate $E_4$ conducts so that NOR gate $N_3$ is cut off and lead 13a is de-energized, allowing flip-flop $B_1$ to be switched upon the arrival of the first stepping pulse 8. NOR gate $N_2$, on the other hand, has no input since AND gate $E_1$ is blocked, this resulting in the energization of lead 13b which locks the flip-flop $B_2$ in its set state. The first stepping pulse 8, therefore, causes the simultaneous setting of both flip-flops whereby NOR gate $N_b$ conducts and energizes the lead 17b in lieu of lead 17a. AND gate $E_2$ is now rendered conductive to de-energize the lead 13b whereby flip-flop $B_2$ also becomes switchable upon the occurrence of the next stepping pulse 8, with resulting resetting of both flip-flops and conduction of NOR gate $N_c$ so that output lead 17c is energized in place of lead 17b. The resetting of flip-flop $B_2$ closes the AND gate $E_4$, thereby energizing the lead 13a to lock the flip-flop $B_1$ in its reset condition. Thereafter, the third stepping pulse 8 sets only the flip-flop $B_2$ and restores the initial condition with energization of output 17a.

If, prior to the start of the next pulse sequence, the reversing switch 78 is thrown to energize the input lead 15, AND gate $E_1$ conducts to cut off the NOR gate $N_2$ whereby flip-flop $B_2$ is made switchable on the first stepping pulse; at the same time, the de-energization of the output of inverter $N_1$ blocks the AND gate $E_4$ so that lead 13a carries voltage to lock the flip-flop $B_1$ in its reset state. Thus, the first pulse 8 brings about the simultaneous resetting of both flip-flops with resulting energization of output 17c. AND gate $E_3$ then conducts to de-energize the lead 13a, permitting simultaneous setting of the two flip-flops on the second pulse 8 with energization of output 17b. Lead 13b is thereupon energized to hold the flip-flop $B_2$ in its set condition as the third pulse 8 resets the flip-flop $B_1$ to re-establish the original condition, with output 17a carrying voltage.

Figure 3:
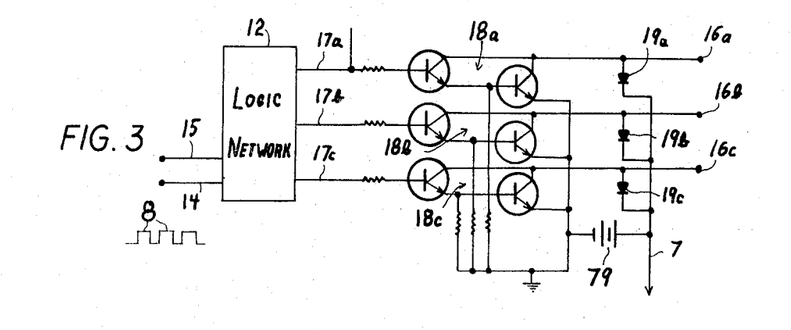
FIG. 3 is a diagram of a control circuit for energizing the motor of FIG. 1.

As illustrated in FIG. 3, outputs 17a, 17b and 17c of logic network 12 work into respective two-stage transistor amplifiers 18a, 18b, 18c whose collectors are tied to terminals 16a, 16b and 16c, respectively, their second-stage emitters being grounded. A source of direct current, shown as a battery 79, applies positive potential to bus bar 7 as described with reference to FIG. 1; this bus bar is connected to terminals 16a, 16b, 16c through the reverse resistances of three diodes 19a, 19b, 19c serving to protect the amplifying transistors from high-voltage positive transients generated in the stator windings of motor 20.

Thus, terminal 16a is normally grounded by the conduction of output lead 17a as described with reference to FIG. 4; depending on the position of switch 78, the sequence of energization of the three output leads (and therefore of the grounding of the associated terminals) is either 17a, 17b, 17c, 17a or 17a, 17c, 17b, 17a.

If the sequence of stepping pulses 8 were not terminated after the third pulse but were repeated $m$ times ($m > 1$), the grounding of terminal 16a would last only for a time equal to the width of pulses 9 and 10 in FIG. 2, i.e. for an interval equaling the recurrence period of pulses 8. Upon the $m^{th}$ re-energization of output 17a, the grounding of terminal 16a would then be maintained for the time necessary to project a frame of film 22 upon a viewing screen.

Figure 7:
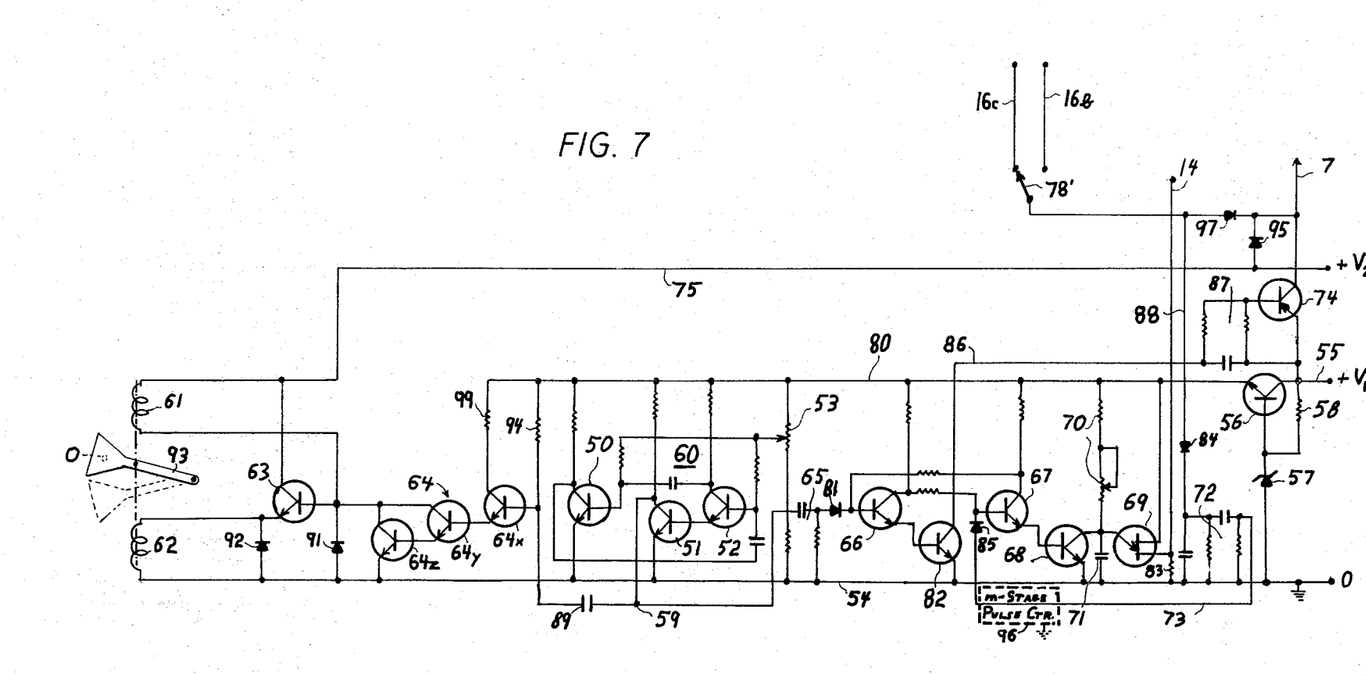
FIG. 7 is a diagram of a pulse generator driving the control circuit of FIGS. 3 and 4.

In FIG. 7 we have shown a pulse generator designed to energize the input lead 14 of logic network 12 (FIG. 4) in the aforedescribed manner. This generator comprises an astable multivibrator 60 with two NPN transistor stages 50 and 52 provided with the usual cross-coupling condensers and resistors. The bases of multivibrator stages 50 and 52 are connected in parallel to a tap on a potentiometer 53 inserted between a grounded bus bar 54 and a positive bus bar 80, the latter being maintained at a stable potential by a transistor 56 whose collector is tied to a positive supply terminal 55 and whose base receives a fixed biasing potential from a voltage divider, including a Zener diode 57 in series with a resistor 58, which lies between ground 54 and terminal 55. Multivibrator stage 52 works into an amplifying transistor 51 whose collector feeds an output lead 59. A pair of further NPN transistors 66, 67 form respective stages of a flip-flop which is settable by multivibrator output 59 via a differentiation circuit 65 feeding the base of transistor 66 through a diode 81. Two other transistors 82 and 68 are driven from flip-flop transistors 66 and 67, respectively, through a Darlington-type connection. Amplifying transistor 68 has its emitter/collector circuit connected across a storage capacitor 71 which charges from bus bar 80 through a variable resistor 70 and is periodically discharged via a unijunction transistor 69, circuit 69 – 71 constitutes a sawtooth oscillator whose cadence can be varied by adjusting the resistor 70. The stepping pulses 8 (FIG. 4) are developed, upon each discharge of capacitor 71, across a small resistor 83 in series with the lower base of unijunction transistor 69, this base being tied directly to lead 14.

Terminal 55 carries a relatively high positive voltage $+V_1$, e.g. of +28V which may be reduced by the transistor 56 to +12V on bus bar 80. Another bus bar 75 is energized with a lower positive voltage $+V_2$, e.g. of +15V. The latter bus bar is connected through a solenoid winding 61 to the base of an NPN transistor 63 and to the collectors of a pair of NPN transistors 64y, 64Z forming the last two stages of a three-stage Darlington-type amplifier 64 whose input stage 64x has its base tied to lead 59 via a capacitor 89 and to bus bar 80 by way of a resistor 94. A diode 91 is connected in blocking direction between grounded bus bar 54 and the junction of coil 61 with the base of transistor 63 and the collectors of transistors 64y, 64z. Transistor 63 has its collector directly tied to bus bar 75 and has its emitter grounded through another solenoid winding 62 in parallel with the reverse resistance of a further diode 92. The collector of transistor 64x is connected to bus bar 80 through a resistor 99.

A conductor 86 extends from the collector of NPN transistor 82 through a delay network 87 to the base of a PNP transistor 74 whose emitter is tied to terminal 55 and whose collector is joined to the bus bar 7 supplying the stator windings of motor 20. This collector is further connected through the reverse resistances of two diodes 95 and 97 to bus bar 75 and to a lead 88, respectively, this lead being alternately connectable to terminals 16b and 16c via a switch 78' which is ganged with the reversing switch 78 of FIG. 4. Conductor 88 further extends through a diode 84 to a differentiation circuit 72 whose output lead 73 is part of a feedback connection passing by way of a diode 85 to the base of transistor 67. In the illustrated position of switch 78', which coincides with the position of switch 78 in FIG. 4, the feedback path extends from bus bar 7 through windings $6c - 6c_3$ and terminal 16c to differentiation circuit 72.

The cores of solenoid coils 61 and 62 are mechanically connected with a shutter 93 for cutting off the light beam from lamp 32 in FIGS. 5 or 6. In the energized state of coil 61, occurring upon conduction of amplifier stage 64z, shutter 93 occupies its full-line position in which it lies athwart the objective axis 0. When amplifier 64 cuts off, transistor 63 is driven conductive and shunts the coil 61 while energizing the coil 62 so that shutter 63 is swung into its alternate dotted-line position in which it unblocks the beam of lamp 32 focused by objective 33–36.

A stepping cycle for motor 20 is started with conduction of the stage 50 of multivibrator 60 which drives output lead 59 positive whereby flip-flop 66, 67 is set, causing saturation of transistor 82 to ground the conductor 86. This action cuts in the PNP transistor 74 so that bus bar 7 receives the high positive voltage of supply terminal 55. With switches 78 and 78' in their illustrated position, rotor 1 turns counterclockwise as terminals 16b, 16c and 16a are successively energized in the aforedescribed manner. Amplifier 64 is turned on and cuts off the transistor 63 so that coil 61 conducts via output stage 64z. Shutter 93 is thereby held in its blocking position.

With transistor 68 also nonconductive, pulse generator 69 – 71 produces a series of three stepping pulses 8 as discussed with reference to FIGS. 2 – 4. At the end of the second stepping pulse 8, i.e. with rotor 1 approaching its next critical position, the deactivation of amplifier 18c (FIG. 3) drives the terminal 16c positive in view of the energy electromagnetically stored in windings $6c - 6c_3$. The resulting positive pulse on lead 88, reshaped in differentiation circuit 72, reaches the base of flip-flop stage 67 so that transistor 82 is cut off while transistor 68 is turned on, thereby preventing further charging of capacitor 71 and disconnecting ground from conductor 86 which is thus driven positive via network 87. The positive voltage of terminal 55 is thus communicated, with a delay established by network 87, to the base of transistor 74 which is thereby rendered nonconductive just as the energization of terminal 16a brings the teeth $2_1, 2_2, 2_5$ and $2_6$ into line with the principal magnet poles excited by windings $6a - 6a_3$. The resulting reduction in the supply voltage reduces the energizing current of these windings to a level sufficient to hold the rotor in its new operating position but low enough to prevent overheating of these windings during the ensuing standstill interval.

The generation of the three stepping pulses by circuits 69 – 71 is assumed to require less than a half-cycle of the operating period of multivibrator 60 whose switchover, resulting in the conduction of transistors 51 and 52 in lieu of transistor 50, produces on lead 59 a negative-going rectangular pulse. The leading edge of this pulse, passed by capacitor 89, cuts off the input stage 64x of amplifier 64 which, therefore, ceases to conduct. Transistor 63 is thereby saturated and energizes the coil 62 in place of coil 61; this reverses the position of shutter 93 which now unblocks the light beam from lamp 32.

The time constant of circuit 89, 94 should be so chosen that capacitor 89 recharges prior to the end of the stepping cycle to cause closure of shutter 93 before the rotor 1 is restarted. In any event, however, the reversal of multivibrator 60 at the end of the cycle generates on lead 59 a positive-going pulse which passes the capacitor 89 and turns on the input stage 64x so that amplifier 64 conducts and re-energizes the coil 61 in place of coil 62.

Potentiometer 53 may be calibrated directly in terms of film speed and may carry particular markings indicative of some standard speeds, e.g. as used for talking pictures. Adjustable voltage divider 70 may be mechanically coupled with this potentiometer to change the pulse rate accordingly, with the number of stepping pulses per multivibrator cycle remaining constant.

The circuit serving for the periodic opening of shutter 93, including coil 62, could also be used for intermittently energizing the lamp 32 of FIGS. 5 and 6, e.g. by way of a nonillustrated transformer replacing that coil. With lamp 32 flashing only during standstill of rotor 1, the shutter 93 can be omitted. On the other hand, such a shutter is needed in the case of a camera (other than one of the stroboscopic type) operating with external illumination. The shutter could also be of the rotary type, being driven from rotor 1 through a suitable transmission which causes it to unblock the light path whenever the rotor is in one of its critical positions.

In the event that the rotor 1 is to be stepped through a multiple of 45° (e.g. through a full circle) between frames, i.e. with $m > 1$, flip-flop 66, 67 is to be reset only with every $m^{th}$ energization of network output 17a. In that case, an $m$-stage pulse counter 96 may be inserted in lead 73 as shown in dot-dash lines, the counter returning to zero automatically on every $m^{th}$ pulse after firing the transistor 67.

By rapidly reversing the switch 78 (FIG. 4), possibly by automatic means establishing predetermined switching periods, the film 22 can be made to advance and retreat a short distance to keep projecting a scene depicted virtually identically in a small number of adjoining frames. With progressive reciprocation, as described above, the scene can be made to change at a fraction of its normal rate. During such reversals, the timer or programmer may adjust an impedance in the operating circuit of lamp 32 to dim it upon prolonged exposure of the same section of film to its rays.

If the projector is to be operated with such periodic reversals, the reel drive 76 should be adjustable to prevent the development of excess slack in the portion of the film which is upstream of sprocket 21. Thus, the supply reel 23 may be nondriven or even subjected to a braking action in such instances, or (especially with progressive reciprocating motion) the torque motor driving that wheel may be energized with less power than the other one so that a differential forward pull exists along the film strip.

It will thus be seen that we have provided a system which very accurately centers each film frame on the optical axis of an associated objective, with the precision required by the fact that any positional error is greatly magnified upon projection. Since (with the possible exception of shutter 93) the system has no reciprocating parts, its noise level during operation is low.

We claim:

1. A stepping drive for intermittently advancing an elongate recording medium longitudinally subdivided into a succession of elemental areas of identical lengths, comprising:

an electric motor having a stator and a rotor coaxial therewith, said stator being provided with electromagnetic means forming an annular array of angularly equispaced magnet poles provided with windings and divided into $2n$ sectors of $p$ poles each, $n$ and $p$ being integers with $p$ at least equal to 3, said rotor having a ferromagnetic body provided with a set of angularly equispaced projections forming armatures for said poles, each set being divided into $2n$ sectors of $q$ projections each, $q$ being an integer greater than $p/2$ but less than $p$, the poles of each sector constituting a principal pole and a plurality of ancillary poles, said rotor having transitory positions in which certain of said armatures are aligned with ancillary poles and stopping positions in which certain of said armatures are aligned with principal poles;

energizing means for said motor connected to said windings for consecutive energization of successive pole pairs each consisting of correspondingly positioned magnet poles of two adjoining sectors connected for concurrent antiphasal excitation, said energizing means including a generator of consecutive sequences of $mp$ pulses each, $m$ being an integer, the last pulse of each sequence energizing said principal poles and having a duration substantially greater than that of the preceding pulses whereby said rotor is invariably arrested in one of said stopping positions;

transport means engageable with said medium; and mechanical coupling means linking said rotor with said transport means for advancing said medium by a single elemental area, for co-operation with associated equipment, upon rotation of said rotor from one stopping position to another stopping position.

2. A stepping drive as defined in claim 1 wherein $q = p - 1$.

3. A stepping drive as defined in claim 1 wherein $m = 2nq$.

4. A stepping drive as defined in claim 1 wherein said generator is provided with adjustment means for varying the cadence of said pulses, thereby altering the speed of said rotor.

5. A stepping drive as defined in claim 1 wherein said generator is provided with switch means for reversing the sense of rotation of said rotor by modifying the order of excitation of said pole pairs.

6. A stepping drive as defined in claim 1 wherein said energizing means comprises a logic network with $p$ outputs energized in immediate succession by consecutive pulses from said generator.

7. A stepping drive as defined in claim 6 wherein said generator comprises timing means provided with a feedback connection from said windings for terminating a pulse sequence in response to excitation of an ancillary pole pair immediately preceding a principal pole pair in the order of excitation.

8. A stepping drive as defined in claim 7 wherein said feedback connection includes an $m$-stage pulse counter.

9. A stepping drive as defined in claim 7 wherein said timing means comprises an astable multivibrator and a flip-flop settable by said multivibrator, said flip-flop being resettable by said logic network via said feedback connection.

10. A stepping drive as defined in claim 9 wherein said generator includes an oscillatory circuit of adjustable frequency blocked in the reset condition of said flip-flop.

11. A stepping drive as defined in claim 9 wherein said multivibrator is provided with adjustable impedance means for varying its switchover period.

12. A stepping drive as defined in claim 9 wherein said multivibrator is provided with an output connection for actuating said associated equipment prior to setting said flip-flop.

13. A stepping drive as defined in claim 7 wherein said energizing means is switchable by said timing means for reducing the current supply to said windings during said interval.

14. A stepping drive as defined in claim 6 wherein said logic network includes gating means selectively biasable to invert the order of energization of said outputs.

15. A stepping drive as defined in claim 6 wherein said logic network includes a binary frequency divider.

16. A stepping drive as defined in claim 1 wherein said medium is provided with longitudinally equispaced perforations, a whole number of said perforations extending over each of said elemental areas, said transport means comprising at least one sprocket engageable with said perforations.

17. A stepping drive as defined in claim 16 wherein said transport means comprises a plurality of sprockets interconnected for synchronous rotation in engagement with different perforated portions of said recording medium.

18. A stepping drive as defined in claim 17 wherein said sprockets have axes disposed at the four corners of an isosceles trapezoid.

19. A stepping drive as defined in claim 1 wherein said recording medium is unwound from a supply reel and wound upon a take-up reel, further comprising ancillary feed means controlled by said motor for driving said reels concurrently with the operation of said transport means.

* * * * *